United States Patent
Raikin et al.

(10) Patent No.: US 9,678,818 B2
(45) Date of Patent: Jun. 13, 2017

(54) DIRECT IO ACCESS FROM A CPU'S INSTRUCTION STREAM

(71) Applicant: Mellanox Technologies, Ltd., Yokneam (IL)

(72) Inventors: Shlomo Raikin, Kibutz Yassur (IL);
Noam Bloch, Bat Shlomo (IL);
Richard Graham, Knoxville, TN (US);
Ofer Hayut, Kvutzat Yavne (IL);
Michael Kagan, Zichron Yaakov (IL);
Liran Liss, Atzmon (IL)

(73) Assignee: MELLANOX TECHNOLOGIES, LTD., Yokneam (IL)

( * ) Notice: Subject to any disclaimer, the term of this patent is extended or adjusted under 35 U.S.C. 154(b) by 91 days.

(21) Appl. No.: 14/608,252

(22) Filed: Jan. 29, 2015

(65) Prior Publication Data

US 2015/0212817 A1 Jul. 30, 2015

Related U.S. Application Data

(60) Provisional application No. 61/933,336, filed on Jan. 30, 2014.

(51) Int. Cl.
| | |
|---|---|
| *G06F 11/00* | (2006.01) |
| *G06F 11/07* | (2006.01) |
| *G06F 9/30* | (2006.01) |
| *G06F 11/36* | (2006.01) |
| *G06F 11/22* | (2006.01) |

(52) U.S. Cl.
CPC ........ *G06F 11/073* (2013.01); *G06F 9/30043* (2013.01); *G06F 11/2236* (2013.01); *G06F 11/3668* (2013.01)

(58) Field of Classification Search
CPC ............. G06F 11/2236; G06F 11/3668; G06F 11/0709; G06F 11/073; G06F 11/0745; G06F 9/30043
USPC .................................. 714/10, 4.1, 42, 43, 53
See application file for complete search history.

(56) References Cited

U.S. PATENT DOCUMENTS

| | | | |
|---|---|---|---|
| 7,139,901 B2 | 11/2006 | Musoll et al. | |
| 8,275,744 B2 * | 9/2012 | Baptist | ................ G06F 11/1076 707/620 |
| 2006/0041733 A1 * | 2/2006 | Hyser | ..................... G06F 12/08 711/203 |

(Continued)

FOREIGN PATENT DOCUMENTS

KR 20020038198 A 5/2002

*Primary Examiner* — Joseph D Manoskey
(74) *Attorney, Agent, or Firm* — Mark M. Friedman

(57) ABSTRACT

A method for network access of remote memory directly from a local instruction stream using conventional loads and stores. In cases where network IO access (a network phase) cannot overlap a compute phase, a direct network access from the instruction stream greatly decreases latency in CPU processing. The network is treated as yet another memory that can be directly read from, or written to, by the CPU. Network access can be done directly from the instruction stream using regular loads and stores. Example scenarios where synchronous network access can be beneficial are SHMEM (symmetric hierarchical memory access) usages (where the program directly reads/writes remote memory), and scenarios where part of system memory (for example DDR) can reside over a network and made accessible by demand to different CPUs.

19 Claims, 5 Drawing Sheets

(56) References Cited

U.S. PATENT DOCUMENTS

| | | | |
|---|---|---|---|
| 2009/0089537 A1* | 4/2009 | Vick | G06F 12/1072 711/203 |
| 2011/0072234 A1* | 3/2011 | Chinya | G06F 12/1027 711/207 |
| 2013/0159676 A1 | 6/2013 | Muff et al. | |
| 2014/0310499 A1* | 10/2014 | Sundararaman | G06F 12/0269 711/203 |
| 2015/0169464 A1* | 6/2015 | Swanberg | G06F 12/1009 711/103 |

* cited by examiner

DIRECT IO ACCESS FROM A CPU'S INSTRUCTION STREAM

CROSS-REFERENCE TO RELATED APPLICATIONS

This application claims the benefit of provisional patent application (PPA) Ser. No. 61/933,336, filed Jan. 30, 2014 by the present inventors, which is incorporated by reference.

FIELD OF THE INVENTION

The present invention generally relates to computer communication, and in particular, it concerns computer access to remote data.

BACKGROUND OF THE INVENTION

Currently, network access is done by writing a descriptor to system memory and informing the IO device that work is ready. Typical implementations include a computer's central processing unit (CPU) writing to the computer's local memory, and then informing a locally attached IO device. The IO device then will fetch the work descriptor (command buffer), perform an actual IO operation (for example, reading a remote memory location over the network), and report completion of the command. The CPU needs to be aware of completion of the written command, typically by either the CPU polling on a completion status or the CPU being interrupted using an interrupt message (for example MSI-X).

This conventional process for network IO access, where network access is done in an asynchronous manner, is beneficial were latency can be tolerated. In this case, the CPU can continue working while the network access is done in the background.

In some cases network IO access (the network phase) cannot overlap the compute phase. In other words, the CPU cannot continue working until the CPU receives (or transmits) the subject data. In these cases, the inherent asynchronous nature of operation adds latency to processing but does not provide any benefit.

SUMMARY

In cases where network IO access (a network phase) cannot overlap a compute phase, a direct network access from the instruction stream decreases latency in CPU processing. At a high level, the general approach to the current embodiments are to treat the network as yet another memory that can be directly read from, or written to, by the CPU. Network access can be done directly from the instruction stream using loads and stores. Example scenarios where synchronous network access can be beneficial are SHMEM (symmetric hierarchical memory access) usages (where the program directly reads/writes remote memory), and scenarios where part of system memory (for example DDR) can reside over a network and made accessible by demand to different CPUs.

According to the teachings of the present embodiment there is provided a method for accessing data including the steps of
(a) issuing, by a CPU, a LOAD command including a virtual address;
(b) deriving network access information based on the virtual address, the network access information including one or more references to a remote memory;
(c) checking, using the one or more references to the remote memory, if access is allowed to the remote memory;
(d) if access is denied to the remote memory:
  (i) then
    (A) notifying the CPU the LOAD command failed; and
    (B) invoking management software to handle the failure of the LOAD command,
  (ii) else attempt to load data from the remote memory;
(e) if the attempt is successful:
  (i) then returning the data to the CPU;
  (ii) else
    (A) notifying the CPU the LOAD command failed; and
    (B) invoking management software to handle the failure of the LOAD command.

In another optional embodiment, further including after the step of issuing: setting a load timer; and if the load timer expires before the data is returned to the CPU then notifying the CPU the LOAD command failed; and invoking management software to handle the failure of the LOAD command.

In another optional embodiment, the step of deriving network access information includes:
(a) translating the virtual address to a physical address;
(b) parsing the physical address for a network address index; and
(c) retrieving at least a portion of the network access information based on the network address index.

In another optional embodiment, the step of retrieving is from a network connection table.

In another optional embodiment, further including parsing the physical address for a remote virtual address portion of the network access information.

In another optional embodiment, the step of deriving network access information includes:
(a) translating the virtual address to a physical address;
(b) parsing the physical address for at least a portion of the network access information.

In another optional embodiment, further including after the step of deriving network access information: waiting for any previously issued STORE commands to the remote memory to be completed prior to continuing with the step of checking.

In another optional embodiment, wherein after the attempt fails further including prior to the step of notifying the CPU: repeating attempt to load data from the remote memory.

According to the teachings of the present embodiment there is provided a method for accessing data including the steps of
(a) issuing, by a CPU, a STORE command including a virtual address;
(b) deriving network access information based on the virtual address, the network access information including one or more references to a remote memory;
(c) checking, using the one or more references to the remote memory, if access is allowed to the remote memory;
(d) if access is denied to the remote memory:
  (i) then
    (A) notifying the CPU the STORE command failed; and
    (B) invoking management software to handle the failure of the STORE command,
  (ii) else attempt to store data to the remote memory;

(e) if the attempt is successful:
  (i) then continue with normal operation of the CPU;
  (ii) else
    (A) notifying the CPU the STORE command failed; and
    (B) invoking management software to handle the failure of the STORE command.

In another optional embodiment, the step of deriving network access information includes:
  (a) translating the virtual address to a physical address;
  (b) parsing the physical address for a network address index; and
  (c) retrieving at least a portion of the network access information based on the network address index.

In another optional embodiment, the step of retrieving is from a network connection table.

In another optional embodiment, further including: parsing the physical address for a remote virtual address portion of the network access information.

In another optional embodiment, the step of deriving network access information includes:
  (a) translating the virtual address to a physical address;
  (b) parsing the physical address for at least a portion of the network access information.

In another optional embodiment, further including after the step of deriving network access information: if the remote memory is strongly ordered then waiting for any previously issued STORE commands to the remote memory to be completed prior to continuing with the step of checking.

In another optional embodiment, wherein after the attempt fails further including prior to the step of notifying the CPU: repeating attempt to store data to the remote memory.

According to the teachings of the present embodiment there is provided a system for accessing data including:
  (a) a processing system containing one or more processors, the processing system being configured to:
    (i) issue a LOAD command including a virtual address;
    (ii) derive network access information based on the virtual address, the network access information including one or more references to a remote memory;
    (iii) check, using the one or more references to the remote memory, if access is allowed to the remote memory;
    (iv) if access is denied to the remote memory:
      (A) then
        (I) send a notification that the LOAD command failed; and
        (II) invoke management software to handle the failure of the LOAD command,
      (B) else attempt to load data from the remote memory;
    (v) if the attempt is successful:
      (A) then return the data;
      (B) else
        (I) send a notification that the LOAD command failed; and
        (II) invoke management software to handle the failure of the LOAD command.

According to the teachings of the present embodiment there is provided a system for accessing data including:
  (a) a CPU (central processing unit) configured to:
    (i) issue a LOAD command including a virtual address; and
    (ii) receive a notification the LOAD command failed and responsive to the notification invoke management software to handle the failure of the LOAD command,
  (b) a local NIC (network interface card) configured to:
    (i) derive network access information based on the virtual address, the network access information including one or more references to a remote memory; and
    (ii) receive a notification that the LOAD failed and responsive to the notification notify the CPU that the LOAD command failed; and
  (c) a remote NIC configured to
    (i) check, using the one or more references to the remote memory, if access is allowed to the remote memory;
    (ii) if access is denied to the remote memory:
      (A) then send a notification to the local NIC that the load failed;
      (B) else attempt to load data from the remote memory;
    (iii) if the attempt is successful:
      (A) then return the data;
      (B) else notify the local NIC that the load failed.

According to the teachings of the present embodiment there is provided a system for accessing data including:
  (a) a processing system containing one or more processors, the processing system being configured to:
    (i) issue a STORE command including a virtual address;
    (ii) derive network access information based on the virtual address, the network access information including one or more references to a remote memory;
    (iii) check, using the one or more references to the remote memory, if access is allowed to the remote memory;
    (iv) if access is denied to the remote memory:
      (A) then
        (I) send a notification that the STORE command failed; and
        (II) invoke management software to handle the failure of the STORE command,
      (B) else attempt to store data to the remote memory;
    (v) if the attempt is successful:
      (A) then continue with normal operation of the system;
      (B) else
        (I) send a notification that the STORE command failed; and
        (II) invoke management software to handle failure of the attempt.

According to the teachings of the present embodiment there is provided a system for accessing data including:
  (a) a CPU (central processing unit) configured to:
    (i) issue a STORE command including a virtual address; and
    (ii) receive a notification the STORE command failed and responsive to the notification invoke management software to handle the failure of the STORE command,
  (b) a local NIC (network interface card) configured to:
    (i) derive network access information based on the virtual address, the network access information including one or more references to a remote memory; and (ii) receive a notification that the STORE failed and responsive to the notification notify the CPU that the STORE command failed; and
(c) a remote NIC configured to:
    (i) check, using the one or more references to the remote memory, if access is allowed to the remote memory;
    (ii) if access is denied to the remote memory:
        (A) then send a notification to the CPU that the STORE command failed;
        (B) else attempt to store data to the remote memory;
    (iii) if the attempt is successful:
        (A) then continue with normal operation of the CPU;
        (B) else notify the local NIC that the store failed.

According to the teachings of the present embodiment there is provided a non-transitory computer-readable storage medium having embedded thereon computer-readable code for accessing data, the computer-readable code including program code for:
(a) issuing, by a CPU, a LOAD command including a virtual address;
(b) deriving network access information based on the virtual address, the network access information including one or more references to a remote memory;
(c) checking, using the one or more references to the remote memory, if access is allowed to the remote memory;
(d) if access is denied to the remote memory:
    (i) then
        (A) notifying the CPU the LOAD command failed; and
        (B) invoking management software to handle the failure of the LOAD command,
    (ii) else attempt to load data from the remote memory;
(e) if the attempt is successful:
    (i) then returning the data to the CPU;
    (ii) else
        (A) notifying the CPU the LOAD command failed; and
        (B) invoking management software to handle the failure of the LOAD command.

According to the teachings of the present embodiment there is provided a non-transitory computer-readable storage medium having embedded thereon computer-readable code for accessing data, the computer-readable code including program code for:
(a) issuing, by a CPU, a STORE command including a virtual address;
(b) deriving network access information based on the virtual address, the network access information including one or more references to a remote memory;
(c) checking, using the one or more references to the remote memory, if access is allowed to the remote memory;
(d) if access is denied to the remote memory:
    (i) then
        (A) notifying the CPU the STORE command failed; and
        (B) invoking management software to handle the failure of the STORE command,
    (ii) else attempt to store data to the remote memory;
(e) if the attempt is successful:
    (i) then continue with normal operation of the CPU;
    (ii) else
        (A) notifying the CPU the STORE command failed; and
        (B) invoking management software to handle the failure of the STORE command.

BRIEF DESCRIPTION OF FIGURES

The embodiment is herein described, by way of example only, with reference to the accompanying drawings, wherein.

ABBREVIATIONS AND DEFINITIONS

Figure 1:
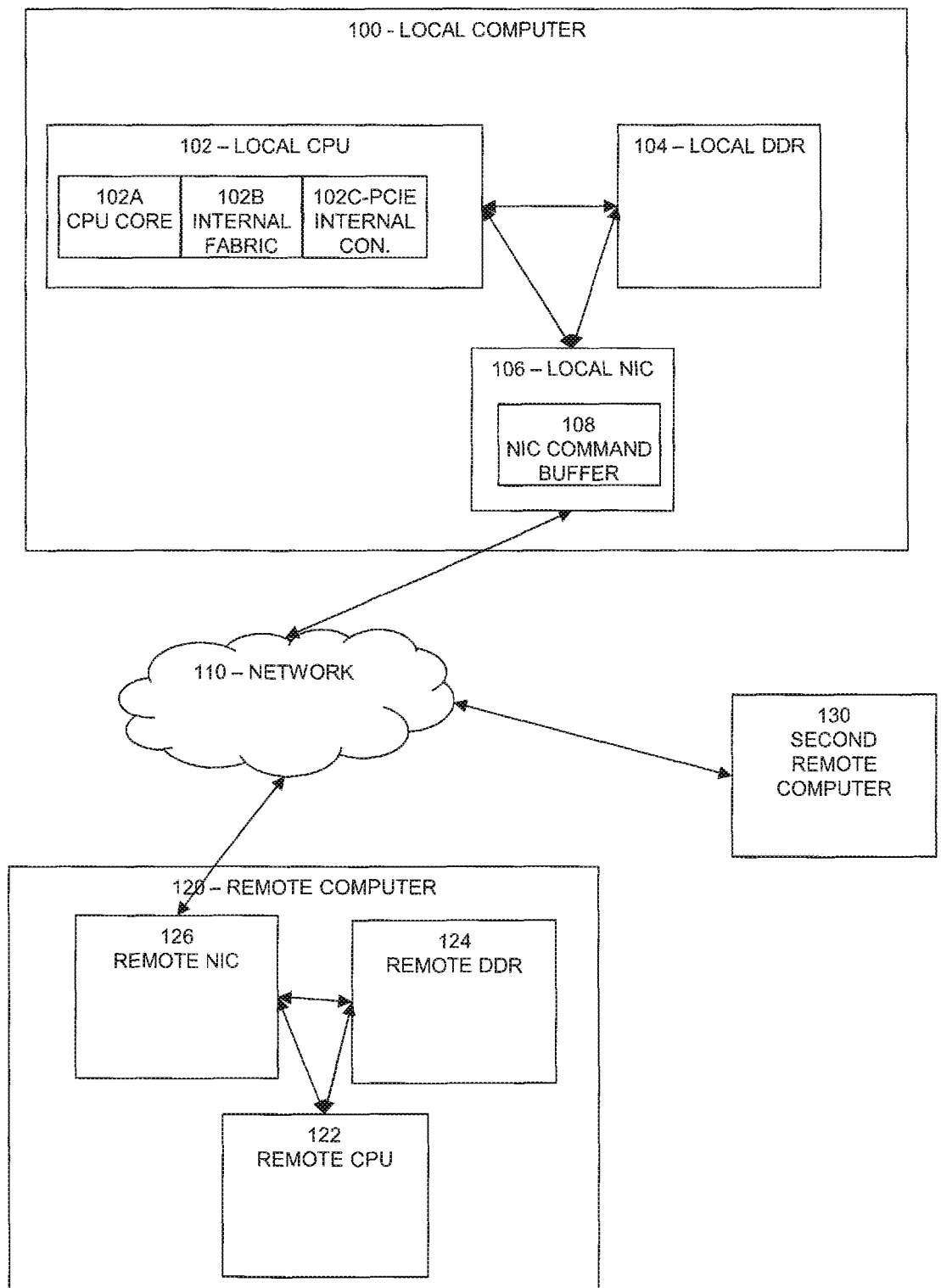
FIG. 1 is a high-level diagram of network access of remote memory.

For convenience of reference, this section contains a brief list of abbreviations, acronyms, and short definitions used in this document. This section should not be considered limiting. Fuller descriptions can be found below, and in the applicable Standards.

ACK—Acknowledgment.

BAR—Base Address Register. To address a PCI device, the PCI device must be enabled by being mapped into a system's IO port address space or memory-mapped address space. The system's firmware, device drivers or the operating system program the BARs to inform the PCI device of address mapping by writing configuration commands to the PCI controller.

Command—A task to be accomplished, such as LOAD and STORE. Commands are implemented at least in part by one or more innovations of the current description.

CPU—Central processing unit. Also referred to as a processor.

Credits—Used in PCIe to expose the internal buffer. A component (for example a CPU) that desires to talk to a PCIe internal device (for example, a NIC) needs credits. The component uses the component's credits each time the component wants to talk to the device. For example, when the CPU wants to talk to the NIC to do a LOAD or STORE.

Descriptor—Used to implement high-level commands such as LOAD and STORE. Descriptors are written to memory and include various information depending on the specifics of the command, for example: read, write, send, destination (network address), actual location in the remote memory (for RDMA), and data or a pointer to data.

DDR—Double data rate. A class of memory integrated circuits used in computers. In the context of this document, the term "DDR" is generally used as a general term to refer to system memory (local or remote), typically local RAM used by the CPU.

GID—Global Identifier. A 128-bit identifier similar to an IPv6 address (technically, a GID is a valid IPv6 identifier with restrictions). The GID consists of the 64-bit GUID plus an additional 64-bit EUI-64 identifier, for a total of 128 bits. The GID is used for routing between subnets. The default GID prefix is 0xfe80::0.

GUID—Global Unique Identifiers (also known as Direct Address). Every host on an InfiniBand fabric has three identifiers: GUID, GID, and LID. A GUID is similar in concept to a MAC address because the GUID consists of a 24-bit manufacturer's prefix and a 40-bit device identifier (64 bits total).

HCA—Host Channel Adapter.

HW—Hardware.

IB—InfiniBand. An industry standard, channel-based, switched fabric interconnect architecture for server and storage connectivity. A computer network communications link typically used in high-performance computing featuring very high throughput and very low latency, as compared to conventional network communications. Information can be found in the IB specification available from the InfiniBand Trade Association Administration (3855 SW 153rd Drive, Beaverton, Oreg. 97006, USA) or on the Internet at http://www.InfiniBandta.org/.

IO—Input/output.

ISA—Instruction set architecture.

LID—Local Identifier. The local identifier (LID) is assigned by the subnet manager. The LID is a 16-bit identifier that is unique within a subnet. Hosts have an LID between 0 and 48,000, usually expressed in hexadecimal notation (such as 0xb1). Routing within a subnet is managed by LID.

LOAD—Operation in which data is requested (and if successful, received), typically as a CPU loads data from memory. For simplicity in the current description, the term LOAD is generally used to refer to accessing remote data (data from a remote location, that is, a location other than local storage/memory).

Memory region—A collection of memory pages within a local HCA's memory.

NACK or NAK—Negative-Acknowledgment.

Network access—In the context of this document, general term referring to LOAD and/or STORE operations. Can also refer to conventional accesses such as InfiniBand RDMA-Read, RDMA-Write, RDMA-Write-With-Immediate, and Send.

Network address information—information required and/or sufficient for a local element to access a remote element. Examples include remote virtual address, destination local identifier (LID), destination GID, destination queue pair, and memory key (memory region).

NIC—Network interface card. Currently, most NICs are PCI-based.

NP credits—Non-posted credits.

Network access information—Information used for network access, such as which network node to access, which memory region within the node to access, an offset within the memory region, and a length (of the memory to be accessed).

OOO—Out-of-order execution. Also known as dynamic execution, an implementation where a processor executes instructions in an order other than the instructions original order in a program, for example based on availability of input data.

PCI—Peripheral Component Interconnect. A high-speed serial computer expansion bus standard.

PCIe—Peripheral Component Interconnect Express. A high-speed serial computer expansion bus standard.

QoS—Quality of service.

RDMA—Remote dynamic memory access.

RF—Register file

SHMEM—Symmetric Hierarchical Memory access. A family of parallel programming libraries, initially providing remote memory access for big-shared memory supercomputers using one-sided communications. Later expanded to distributed memory parallel computer clusters, and is used as parallel programming interface or as low-level interface.

SM—Subnet manager.

STORE—Operation in which data is sent (and if successful, stored in a destination), typically as a CPU stores data to memory. For simplicity in the current description, the term STORE is generally used to refer to sending or writing data to a remote location (location other than local storage/memory).

Strongly-ordered memory systems (models)—Systems in which memory requests (load and store operations) are not allowed to be reordered, that is, values are accessed in the same order in which the values were written.

SW—Software.

TCA—Target channel adapter.

VC—Virtual channel.

Weakly-ordered memory systems (models)—Systems that are allowed to reorder memory requests. Any load or store operation can effectively be reordered with any other load or store operation, as long as the store would never modify the behavior of a single, isolated thread.

DETAILED DESCRIPTION

First Embodiment

FIGS. 1 to 6

The principles and operation of the system according to a present embodiment may be better understood with reference to the drawings and the accompanying description. A present invention is a system for network access of remote memory directly from a local instruction stream using conventional loads and stores.

Referring now to the drawings, FIG. 1 is a high-level diagram of network access of remote memory. A local computer 100 includes a local CPU 102 with associated local DDR 104 and a local NIC 106. The local NIC 106 includes an internal NIC command buffer 108. Local computer 100 is connected via a network 110 to at least one other computer, such as remote computer 120. Similar to local computer 100, remote computer 120 includes a remote CPU 122 with associated remote DDR 124 and a remote NIC 126. Additional computers such as second remote computer 130, similar to local computer 100 may also be in operational connection, typically via network 110. In this document, connection and operation of the local and remote computers (100, 120) may also be referred to as connection between the local and remote CPUs (102, 122). Local and remote computers are also referred to in the field as nodes. The NICs may be integrated with the associated CPUs, or as shown in the current figure, separate and operationally connected. Typically, connection of CPUs and NICs are via a PCIe bus, and this non-limiting implementation is used in the current description. However, one skilled in the art will realize that other connections and element, module, and component configurations are possible.

The current embodiment can be implemented for a variety of architectures. For simplicity in the current description, the current embodiment will be described using a non-limiting implementation with InfiniBand (IB). IB is a known high-performance networking standard.

Conventional network access is done by the local CPU 102 writing a descriptor (command, command buffer) to local system memory (local DDR 104). Then the local CPU 102 informs the local NIC 106 (generally any IO device) that the descriptor is ready (work is ready for the local NIC 106).

The local NIC 106 then will fetch the descriptor from local DDR 104, perform an actual IO operation (for example, reading a remote memory location over the network, such as from remote DDR 124), and report completion of the descriptor. After the local NIC 106 has completed the task associated with the descriptor, the CPU needs to be aware of completion of the written descriptor. Typically, either the local CPU 102 polls on a completion status or the local CPU 102 is interrupted using an interrupt message. As described above, in this conventional process for network IO access, network access is done in an asynchronous manner and the local CPU 102 can continue working while the network access is done in the background.

The present embodiment facilitates network access of remote memory directly from a local instruction stream using conventional loads and stores. In other words, using existing, normal, default commands (such as LOAD and STORE) that have not been altered (unaltered, native commands) for additional and/or alternate operations. Analysis and research to implement embodiments of the present invention for accessing the network directly from the instruction stream (and specifically accessing remote memory), developed the following points that should be addressed for successful implementation:

How to convert a store to network write?
How to convert a load to network read?
If to allow speculative OOO access to the network, and how to handle?
How to treat network errors if the operation (command) does not complete successfully (both loads and stores)?
How to convert memory addressing to network addressing?
How to handle memory ordering?

When considering the current problem, the above points are not obvious points to form a set of issues that need to be addressed. Additionally, there are detailed interrelations between some of the points. Thus, independent solutions cannot be combined to solve this problem. Conventional solutions for address decoding, tunneling a command over a network, handling OOO execution, and memory are not sufficient without additional innovative synergy described in the current description.

In the context of this description, the phrase "invoke management software" is used for simplicity to refer to a CPU transferring execution (flow control) from the current thread (software or application, of the local CPU) to a different (other, alternate, and/or new) thread (management software, other software, or application), thereby continuing with normal operation of the CPU. In other words, the CPU does not crash, instead possibly informing a user or a currently running software application of the event, rolling execution back to a recent checkpoint, stopping execution of the current thread, continuing execution of the current thread at a different point, and/or gracefully terminating operation of the system. Flow control can be transferred using conventional techniques such as a "Fault" or an "Interrupt".

1. Speculative OOO Access to the Network (Overlapping Reads from the Network)

Modern CPU architectures typically implement a deep pipeline, where instructions are executed out of order (OOO) and speculatively. A major benefit of this architecture is the fact that loads are executing speculatively such that misses to main memory are being overlapped. In conventional computers OOO (speculative access) for network access is not done. In other words, (well-written) conventional software will only try to access areas (such as memory) that the software has access to, that is, are pre-authorized for the software to access. In this conventional implementation, the software will not try to access an area that the software cannot reach, so this situation does not need to be handled by the software.

Viewing a network as yet another data source (similar to memory), allows for executing loads from the network OOO thereby pipelining network accesses, which can result in huge latency reduction, as compared to conventional network loads. This OOO implementation also implies that branch prediction while executing a sequence of commands can try to access areas that are not authorized (the software does not have access to). In other words, the micro-architecture may be performing actions that the user (software) does not want, possibly never wanted nor planned to authorize.

Due to branch miss-prediction, load accesses from the network may execute without the programmers intent. Speculative network loading can be made resilient to this branch miss-predication using the following implementation:

A. Loads from areas that the remote host has made available (accessible or permitted to be accessed) to the network will happen without any side effect. For example, on remote computer 120, memory regions of remote DDR 124 that have been made available to other computers, such as local computer 100.

B. Loads from areas that the remote host did not make available will be identified by paging tables in a remote NIC and will be dropped. For example, on remote computer 120, memory regions of remote DDR 124 that have not been made available are identified by paging tables in remote NIC 126. In conventional implementations, attempts to load from memory regions that are not available result in the LOAD request being dropped and notifying the originator of the LOAD request to not allow subsequent LOAD requests for this memory region. In contrast to this conventional operation, an innovative NACK response will be sent (from the remote NIC 126) to the requesting NIC (local NIC 106), and the network will continue operating unhindered. In other words, while the current LOAD request is dropped, the originator of the LOAD request may re-issue a LOAD request. This NACK is the result of branch mis-prediction and can be implemented in hardware (without invoking management software).

Stores do not execute speculatively, so an attempt to store to a remote memory that is not authorized (attempt for unauthorized access) results in a fatal error (for the network connection). In this case, a NACK will result in "Connection Termination" and invocation of management software (transfer of control of execution).

2. Required Support from the CPU (how to Treat Network Errors if the Operation (Command) does not Complete Successfully)

Conventional LOADs and STOREs are executed by a CPU to local attached memory, for example by local CPU 102 to local DDR 104. In modern computers, access to this local memory is reliable—so much so that unrecoverable errors are typically not handled, and typically results in an unrecoverable exception (such as known in the vernacular as the "blue screen of death"). For example, if a memory access returns data with an unrecoverable parity error.

In the current embodiment, a CPU can execute a LOAD command for remote memory—via a network that is unreliable in comparison to conventional access to local memory. For example, the local CPU 102 executing a LOAD via the network 110 for data stored on the remote DDR 124. In this case, a network error can result in a load fault (failure to load the requested data/from remote DDR 124). In other words, the previously reliable local loading and storing is relatively unreliable for remote loading and storing Remote memory access using conventional loads and stores can be made resilient to network errors using implementations based on the following method:

A. Let a LOAD fault in case of network error.

In case of network error, the IO device (for example, the local NIC 106) will inform the CPU (for example, local CPU 102) that the LOAD will not complete. Informing can be done using known methods, for example, by using PCIe's completer abort encoding (assuming the typical modern connection of the NIC to the CPU via PCIe). Then the CPU will invoke management software to handle this event (LOAD fault).

Additionally, faulting can be invoked implicitly by the CPU, for example by setting a timer every time a LOAD is executed, and if the timer expires before the LOAD completes, faulting (informing the CPU that the LOAD will not complete).

B. Stores need to be completed once entering the internal PCIe controller.

Typically, a CPU core 102A is connected via an internal fabric 102B to a PCIe internal controller 102C in the CPU 102. When the CPU core 102A sends a STORE to the PCIe internal controller 102C, the CPU core 102A considers the STORE successful (due to the high reliability of internal connections).

With the implementation of remote memory access, stores cannot be assumed to be successful, due to the relatively lower reliability of the network 110. An asynchronous fault in case of a network error on store can be implemented. This STORE fault can notify the CPU core via a known technique such as using an interrupt or a mailbox. Similar to the above-described handling of LOAD faults, the CPU can invoke management software to handle the STORE fault, thus avoiding an unrecoverable exception that would stop CPU operation. The management software can, for example, continue operation of the CPU at an earlier checkpoint.

In a case where the CPU needs to wait for the STORE to complete, or operation would be improved by waiting for the success or failure of the STORE before continuing, after a STORE is executed a LOAD can be executed. Thus, before continuing the CPU core will wait for the LOAD to complete—which implies that the previous STORE has completed. Refer to the section elsewhere in this description on memory ordering and flushing stores.

C. Generate a network address, as described below.

3. Implementation in the NIC

Modern computers typically use some sort of credit scheme to handle (throttle) access from the CPU to devices. For example from local CPU 102 via a PCIe bus (not shown) to local NIC 106. PCIe flow control manages accesses to the NIC using posted credits (to throttle writes to the NIC) that will become network access) and non-posted (NP) credits (to throttle reading data from the NIC that will become a network access).

In the current implementation, an association from physical address to network address is implemented in the NIC. See the below section on generating a network address for more details. Responses can be handled using implementations based on the following method:

Read response:
  Successful—The NIC can return a read response as a regular PCIe device (PCIe completion with the correct tag identifying the request).
  Failure—The NIC can return a response using the "Completer Abort" encoding indicating the device (local NIC on behalf of the remote NIC) is unable to send a response.

Write response:
  Successful—no further actions required.
  Failure—Inform the CPU, for example by sending an interrupt o the CPU or writing to a specific mailbox.

Based on this description, one skilled in the art will be able to implement NIC communications with the CPU (bus communications).

4. Generating a Network Address (Converting Memory Addressing to Network Addressing)

When performing a network access (for example, using conventional (normal, unaltered) commands such as LOAD or STORE), multiple addressing components are required, including:

A. The network location of the remote node (for example, IP address or InfiniBand's GID).

B. The memory/protection domain within the network address (for example, InfiniBand's memory region).

C. The actual address that needs to be accessed.

D. The length of the access (size/amount of memory to access).

In the context of this description, a NIC associated with a DDR from which data is requested is also referred to as a target NIC. In the current non-limiting example, local computer 100 with local NIC 106 sends a request to remote computer 120 where the request is received by remote NIC 126, the target NIC. Using a protocol such as RDMA, when a target NIC receives a request for data, the NIC can access associated memory without CPU interaction. For example, a request is received at remote NIC 126 which accesses remote DDR 124 independently of (without interaction with) remote CPU 122. In the InfiniBand specification a "memory region" is defined in the DDR that is accessible to remote users, while other portions of DDR memory, that are not in the memory region, are accessible only via the CPU (not directly accessible to remote users).

In conventional network access, a CPU uses multiple writes of data to local memory including some writes for network address information and some writes for the information to be transmitted. After the multiple writes are completed, then the CPU notifies the NIC that the data is ready (for pickup/transmission by the NIC). Then the NIC reads the data from local memory (comes to get the data), and then transmits (writes) the data to a target remote memory (remote location).

Figures 2, 3:
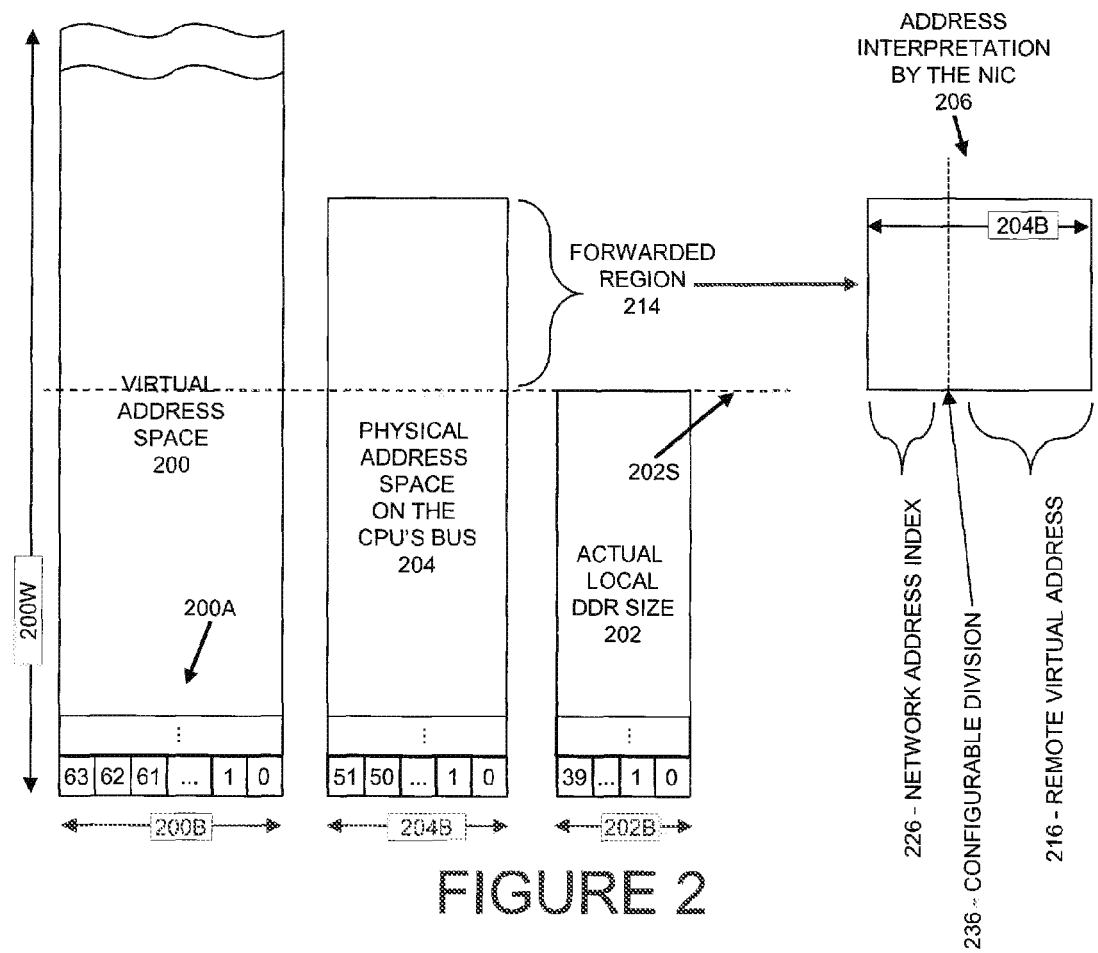
FIG. 2 is a simplified diagram of memories and usage.
FIG. 3 is a sketch of an exemplary network connection table.

Refer now also to FIG. 2, a simplified diagram of memories and usage. In the current figure, the number of bits used in an address is shown horizontally with wider boxes indicating more bits in the address. The number of addresses is shown vertically, with higher boxes indicating more addresses. For a clarifying example, refer to virtual address space 200. Each address 200A is M-bits, where M is an integer, for example 64, shown as width number of virtual address bits 200B. The number of virtual addresses is shown as height 200W. The number of addresses 200W is determined by the number of bits 200B in each address 200A. In the current example using the number of virtual address bits 200B=64 the number of addresses 200W=2^M, or 2^64. Similarly shown is the number of physical address bits 204B (for example 52 bits) and the number of actual DDR address bits (DDR size) 202B (for example 40 bits).

A virtual memory has a virtual address space 200. The size of the virtual memory is referred to in the field as the size of the virtual address space, virtual address size, or virtual address space. One skilled in the field will understand the usage of terms from the context of the discussion. Space for virtual addressing is typically limited by the architecture to the system. For example, in x86 and ARMv8 the virtual address space is limited to 64 bits (2^64 addresses). Physical DDR (such as local DDR 104) has a DDR size 202 that is typically smaller than the size of the virtual address space 200. Dashed horizontal line 202S corresponds to the DDR size 202. Addresses below the dashed line 202S are below, or within the DDR size 202. Addresses above, or on top of the dashed line 202S are more than, out of, or beyond the range of the DDR size 202. Physical address space 204 is the physical space on the CPU's bus for accessing actual DDR. The physical address space 204 that is above the DDR size 202 is shown as forwarded region 214. Typically, the virtual address space is larger than the DDR size and larger than the physical address space 204. Typically, the physical address space 204 is larger than the DDR size 202. Forwarded region 214 is interpreted 206 by the NIC to provide network address information. The forwarded region has two parts: a network address index 226, and a remote virtual address 216. There is a configurable division (dotted vertical line) 236 between the network address index 226 and the remote virtual address 216. For example, if physical address space 204 has 52 physical address bits (204B=52) and access is desired for (up to) 2^10 different network locations, the configurable division 236 will be at bit 41. Bits 51:42 will denote the network address index 226 and the remaining 42 bits 41:0 can be used for the remote virtual address 216.

In the current embodiment, descriptors, corresponding to commands, are first written to memory, later fetched, and used by a NIC. For example, written by the local CPU 102 to the local DDR 104 to be used by the local NIC 106. This first writing is to virtual memory having a virtual address space 200. However, the physical address space 204 used with the NIC is smaller than the virtual address space 200 (204B<200B).

The current embodiment features a single store of data from the CPU for the NIC, in contrast to conventional network access that requires multiple writes of data to local memory. One issue that needs to be handled for the current embodiment is: how can the address bits (physical address bits 204B) be used to relay all of the data required for network access (transmission and receipt)? To handle this issue, the data can be written to a memory location, but now a memory location directly in the NIC. Then the NIC uses the remote address location to copy the data from the NIC to the remote address location (remote memory location). This is shown by the DDR size 202 being smaller than the size of the virtual address space 200. For example, modern computers might implement 64 bits of virtual memory, but only can use about 40 bits for actual DDR physical addresses.

In addition, when converting memory addressing to network addressing, additional information is required, such as described in the above list (memory domain, actual address, length, etc.). A solution to passing the required information using a limited number of bits is based on using the following method:

A. An existing paging mechanism (for example TLB) can be used to map a region of the virtual address space 200 to the network (via physical address space 204). This region of the virtual address space is shown as forwarded region 214. In other words, the TLB in the local CPU 102 converts a virtual address specified by the command to a physical address, and then the physical address is transferred to the local NIC 106. An access to the forwarded region 214 will result in a physical address which is beyond the DDR size 202 (above the top of the DDR address space 202S) on the system.

B. When the NIC sees an access request with a pre-determined physical address bit set (corresponding to an address in forwarded region 214), the NIC re-interprets 206 the bits of the address (from the forwarded region 214, not as a single address but) as two parts (pieces of information):

I. a network address index 226, and

II. a remote virtual address 216.

In RDMA, a network access requires the following information:

Which network node to access,

Which memory region within the node, and

An offset within the memory region.

The first two values are extracted from the table accessed using the network address index (entries 326). The network address index 226 is used to access entries 302 in a network connection table 300, described below to provide at least a portion of network access information such as which network node to access and which memory region within the node. The remote virtual address 216 can be used as the offset within the memory region of the remote memory. A length (of the memory to be accessed) can be given as part of the request on the PCIe bus from the local CPU to the local NIC.

A division between the network address index 226 and the remote virtual address index 216 is preferably configurable (shown as the configurable division 236). In other words, how many bits should be used for the network address index 226 and how many bits should be used for the remote virtual address index 216. For example, if 52 bits are used for each physical address and local computer 100 needs to communicate with less than 1023 remote computers (120, 130, etc.), then 10 bits can be used for the network address index 226 and the remaining 42 bits can be used for the remote virtual address 216.

C. Refer now also to FIG. 3, a sketch of an exemplary network connection table. The NIC will use the network address index 226 (determined as described above) to access a network connection table 300. The network connection table 300 is typically prepared ahead of time (before operational use) and contains information needed for the local computer 100 (local CPU 102) to communicate with remote computers. The network connection table can live in the computer's main memory and be cached in the NIC, or can reside in the NIC's internal storage. Each network address index 226 refers to an entry in the network connection table 300. For example, network address index "INDEX A" 326A1 corresponds to entry "ENTRY A" 326A2. Similarly, network address index "INDEX B" 326B1 corresponds to entry "ENTRY B" 326B2, and in general, network address index "INDEX N" 326N1 corresponds to entry "ENTRY N" 326N2. Each entry includes information and/or pointers sufficient for the local computer 100 to communicate with remote computers. Obviously, the size of network connection table 300 will be determined by the number of network address indexes and amount of information (size/number of bits) needed for each entry 302. Each entry 302 describes the network connection for one target (remote computer). For example, an entry can include:

Destination local identifier (LID)

Destination GID

Destination Queue Pair

Memory Key (memory region)

The NIC can send a network packet to the network destination using the remote virtual address 216 extracted from the address bits, and the entry 302 information based on the network address index 226 as was originally requested by the CPU. For example, the local NIC 106 accesses the network connection table 300 based on INDEX A 326A1 and uses corresponding ENTRY A 326A2 information to communicate with a memory region on remote DDR 124. Optionally, the process of network address generation can be virtualized by a hypervisor.

Since the division between network address and virtual address is configurable (the configurable division 236) the current architecture can support multiple configurations. For example:

Fewer remote machines (less bits needed for the network address indexes 226), each with high amount of memory (relatively more bits used for the remote virtual address 216).

More remote machines (more bits needed for the network address indexes 226), each with less memory (relatively fewer bits used for the remote virtual address 216) attached to each of the remote machines.

Alternatively, if the forwarding region 214 includes enough bits (number of physical address bits 204B) to encode all of the required data for network access, then instead of extracting the network access fields from the network connection table 300 the data can be directly encoded in the address bits of the forwarded region 214. For example, the InfiniBand "Send" operation does not require a remote virtual address 216 (functions without explicitly specifying a remote virtual address 216) so the remote virtual address 216 field is not required and all of the physical address bits 204B can be used to encode network access information, such as:

Destination LID,
Destination QP, and
Solicited event.

Alternatively, if the target NIC (for example remote NIC 126) handles the remote virtual address 216 then the remote virtual address 216 is not needed in the address interpretation 206 and all of the physical address bits 204B can be used as the network address index 226 to reference the network connection table 300. In this case, the configurable division 236 can be considered to be 0 (zero).

5. Memory Ordering:

A memory ordering suitable for implementing the current embodiment is now described. In general, memory ordering can be considered a definition of use from a system to a user of the system. In other words, an architecture (microarchitecture) defining how a user sees memory access. General definitions and use of strongly ordered and weakly ordered memory implementations are known in the art, and will not be further discussed. In order to support the current embodiment of network access of remote memory directly from a local instruction stream using conventional loads and stores, several variations of memory ordering semantics can be implemented. A non-limiting example of a preferred implementation includes the following semantics:

A. Loads are weakly ordered (as implied from the InfiniBand specification).

B. Stores to a single network destination may be either weakly or strongly ordered (thus an implementation may choose to reorder stores internally)—both options can be supported.

C. Stores to different (at least two) network destinations are weakly ordered.

D. Loads from a given network destination will guarantee all pending stores to the given network destination memory are completed, as in the current InfiniB and memory ordering definition. In PCI terms, loads will keep flushing stores. In other words, a LOAD command is a barrier to all STORE commands—when a LOAD command is issued, all previously issued STORE commands are completed prior to the LOAD command executing.

Figure 4:
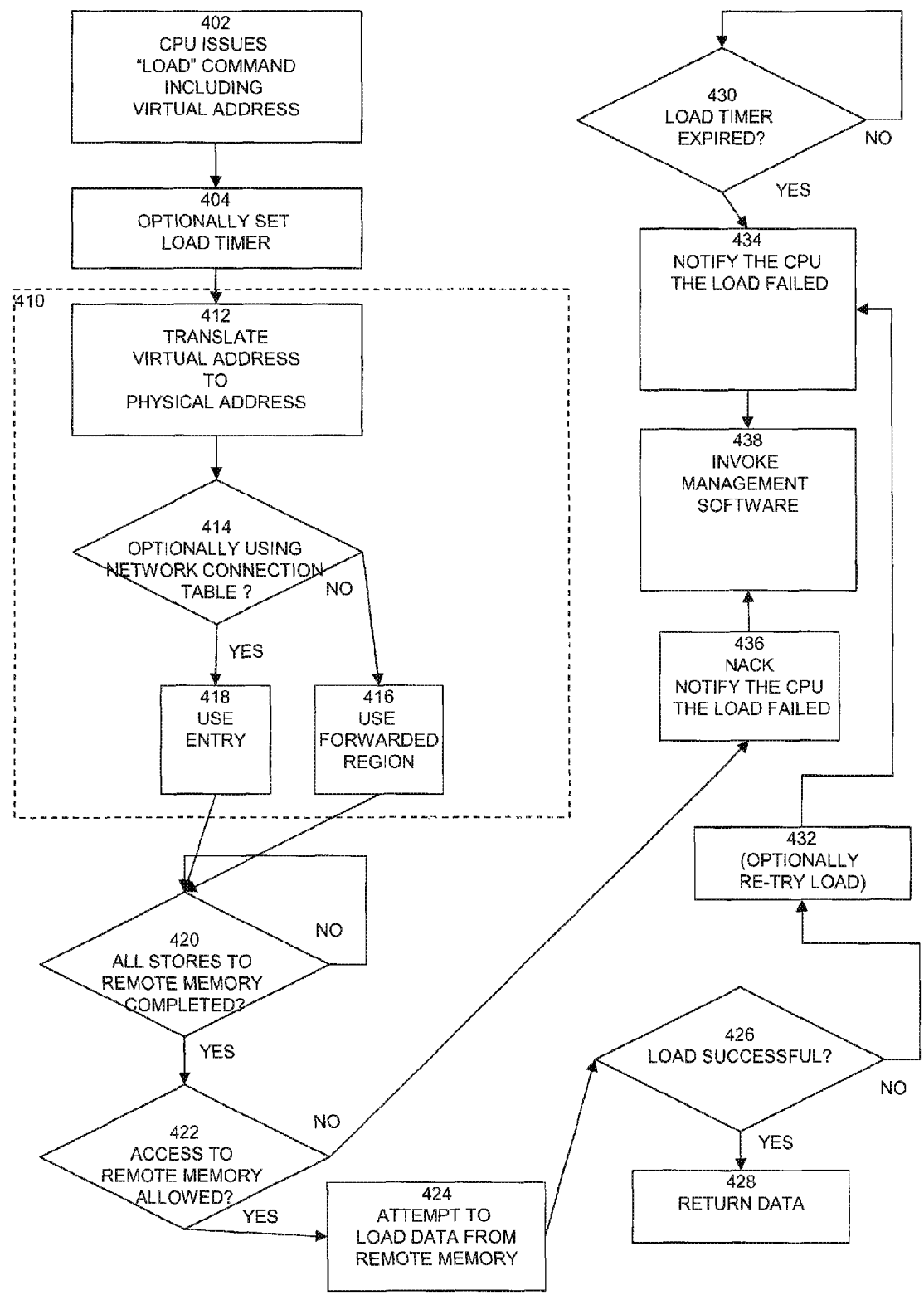
FIG. 4 is a flowchart of a method of loading data.
Figure 5:
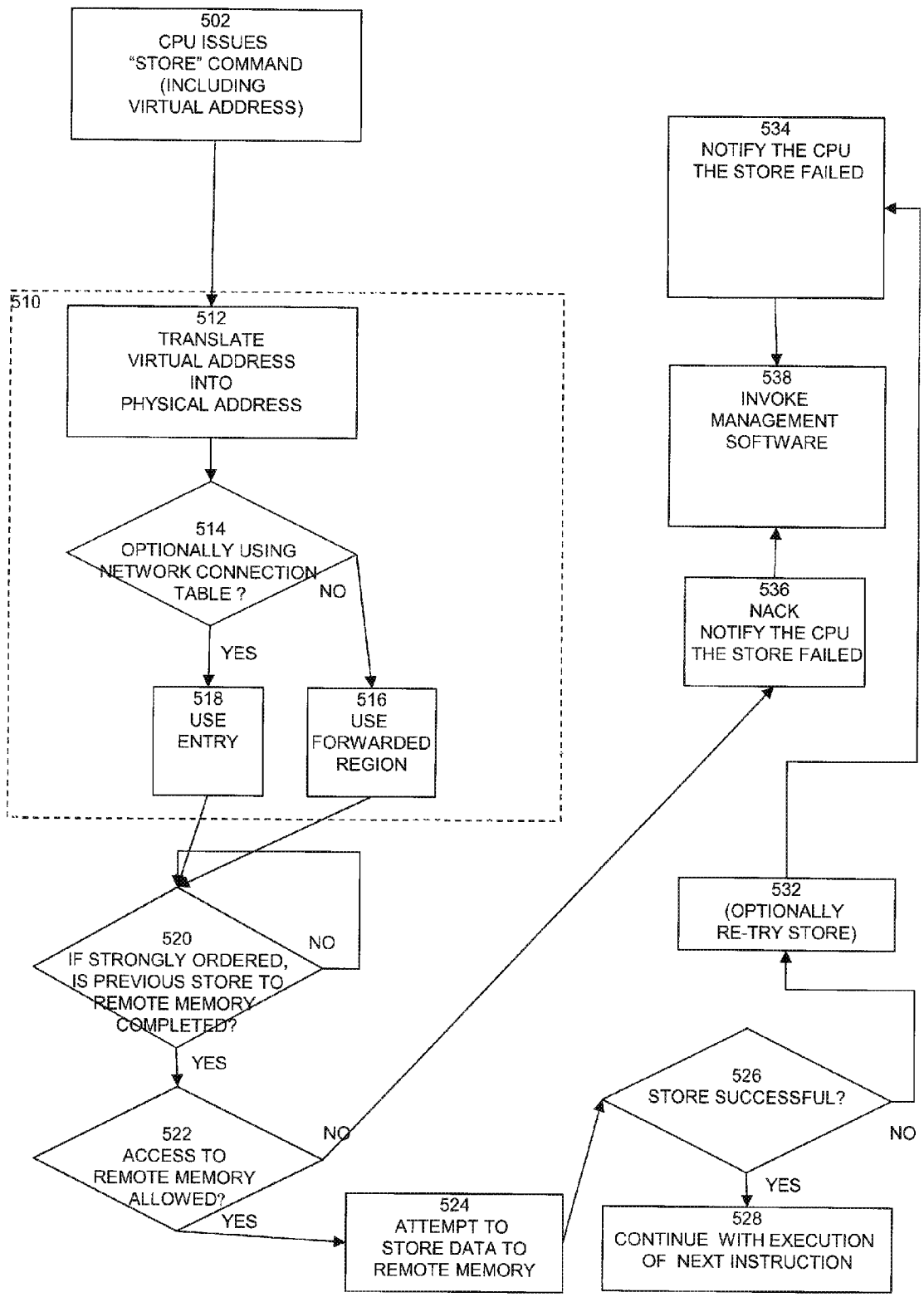
FIG. 5 is a flowchart of a method of storing data.

Refer now to FIG. 4, a flowchart of a method of loading data and FIG. 5, a flowchart of a method of storing data. In general, the current methods can be performed by a processing system containing one or more processors configured to execute steps of the current methods. In particular, processors such as CPUs (local CPU 102) and NICs (local NIC 106) can perform network access of data in remote memories (remote DDR 124). The use of specific elements for simplicity and clarity does not limit the scope of the methods of this invention.

A method for accessing data, in particular for loading data from the remote DDR 124 to the local CPU 102 (or to the local DDR 104), begins with the local CPU 102 issuing (block 402) a LOAD command. The LOAD command includes at least a virtual address on the local computer 100. The local NIC 106 derives (block 410) network access information based on a physical address converted from the virtual address. The network access information includes one or more references to the remote memory (remote DDR). The one or more references to the remote memory are used to check (block 422) if access is allowed to the remote memory 124. Typically the remote NIC 126 implements the check (block 422) if access to remote memory is allowed.

If access is denied (not allowed) to the remote memory 124 then a NACK (block 436) is used to notify the local CPU 102 the LOAD command failed and the local CPU 102 invokes management software (block 438). If access is allowed to the remote memory 124 then the remote NIC 126 attempts (block 424) to load data from the remote memory 124.

If (block 426) the attempt to load data (block 424) is successful (does not fail), the data is loaded from the remote memory 124 and then returned (block 428) to the local CPU 102 (to the originator of the load request). If the attempt is not successful (fails), then the local CPU 102 is notified (block 434) the LOAD command failed, and management software is invoked (block 438) to handle failure of the attempt. Optionally, after the local CPU 102 issues (block 402) a LOAD command, a load timer can be set (block 404). If the load timer expires before the data is returned to the local CPU 102 then the local CPU 102 is notified (block 434) the LOAD command failed, and management software is invoked (block 438) to handle failure (timeout) of the LOAD command.

Network access information can be derived by various methods as described elsewhere in this document. Optionally, deriving (block 410) network access information includes translating (block 412) the virtual address 200 to a physical address 204. If (block 414) a network connection table 300 is being used, the physical address 204 is parsed for a network address index 226. The network address index 226 is then used to access (block 418) an entry 302 in the network connection table 300 and retrieve at least a portion of the network access information (based on the network address index). The physical address 204 can also be parsed for (to provide) a remote virtual address 216 portion of the network access information.

Optionally, deriving (block 410) network access information includes translating (block 412) the virtual address 200 to a physical address 204. If (block 414) a network connection table 300 is not being used, the forwarded region can be used (block 416) to provide at least a portion of the network access information. Optionally, the physical address can be used to provide all of the network access information required for the current command. In other words, network access information can be derived and/or provided without (independent of) the network connection table 300. For example, the physical address 204 can be parsed for at least a portion of the network access information.

Optionally, after the step of deriving (block 410) network access information the method waits (block 420) for any previously issued STORE commands to the remote memory 124 to be completed prior to continuing with the step of checking (block 422). Waiting (block 420) can be done either on the local NIC 106 or the remote NIC 126. Typically waiting (block 420) is done on the remote NIC 126. In general, blocks 402 through 418 are implemented in the local computer 100, and blocks 420 through 430 are implemented in the remote computer 120. Optionally, prior to the step of invoking (block 434) management software the method (local NIC 106) can repeat the attempt (block 424) to load data from the remote memory 124.

Refer again to FIG. 5. Similar to the above-described method for loading data, a method for storing data to the remote DDR 124 from the local CPU 102 (or from local DDR 104), begins with the local CPU 102 issuing (block 502) a STORE command. The STORE command includes at least a virtual address on the local computer 100. The local NIC 106 derives (block 510) network access information based on a physical address converted from the virtual address. The one or more references to the remote memory are used to check (block 522) if access is allowed to the remote memory 124. Typically the remote NIC 126 implements the check (block 522) if access to remote memory is allowed.

As described above, if access is denied (not allowed) to the remote memory 124 then a NACK (block 536) is used to notify the local CPU 102 the STORE command failed. Then management software will be invoked (block 538) to handle the connection termination and transfer of control of execution. If access is allowed to the remote memory 124 then the remote NIC 126 attempts (block 524) to store data to the remote memory 124.

If (block 526) the attempt to store data (block 524) is successful (does not fail), the data is stored to the remote memory 124 and then the local CPU 102 continues (block 528) with normal operation (execution of the next instruction). If the attempt is not successful (fails), then the local CPU 102 is notified (block 534) the STORE command failed and management software is invoked (block 538) to handle failure of the attempt, Similar to block 410, network access information can be derived by various methods as described elsewhere in this document. Optionally, deriving (block 510) network access information includes translating (block 512) the virtual address 200 to a physical address 204. If (block 514) a network connection table 300 is being used, the physical address 204 is parsed for a network address index 226. The network address index 226 is then used to access (block 518) an entry 302 in the network connection table 300 and retrieve at least a portion of the network access information (based on the network address index). The physical address 204 can also be parsed for (to provide) a remote virtual address 216 portion of the network access information.

Optionally, deriving (block 510) network access information includes translating (block 512) the virtual address 200 to a physical address 204. If (block 514) a network connection table 300 is not being used, the physical address 204 can be parsed for at least a portion of the network access information.

Optionally, after the step of deriving (block 510) network access information, if the remote memory 124 is strongly ordered, then the NIC (preferably the remote NIC 126 but optionally the local NIC 106) waits for any previously issued STORE commands to the remote memory 124 to be completed, prior to continuing with the step of checking (block 522) if access is allowed to the remote memory 124.

Optionally, prior to the step of notifying (block 534) the method (the local NIC 106 or the remote NIC 126) can repeat the attempt (block 532) to store data to the remote memory 124.

Figure 6:
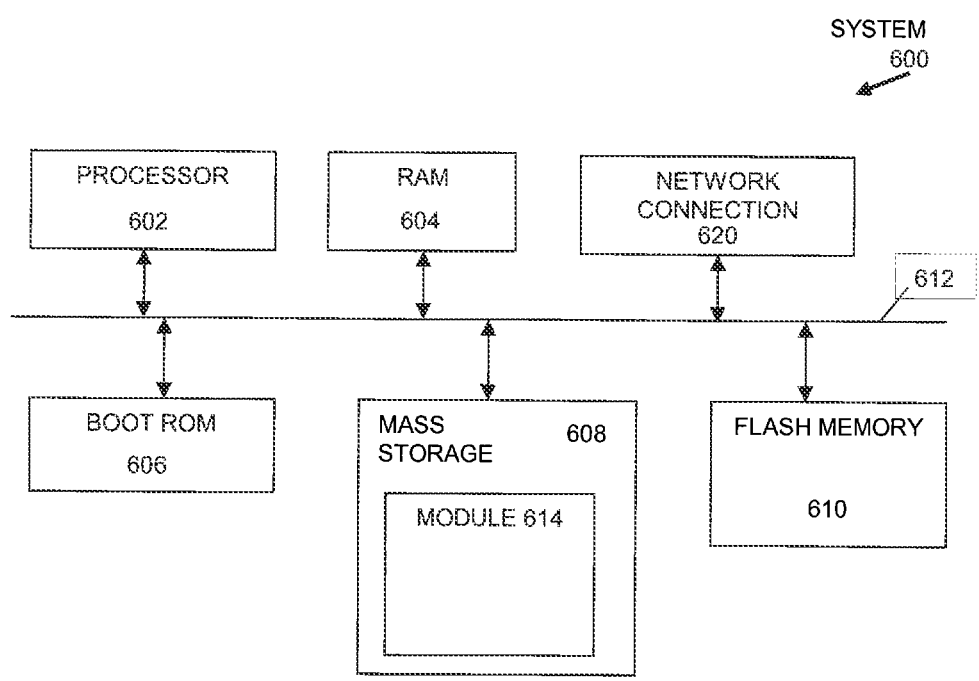
FIG. 6 is a high-level partial block diagram of an exemplary system configured to implement a method of the present invention.

FIG. 6 is a high-level partial block diagram of an exemplary system 600 configured to implement a method of the present invention. System (processing system) 600 includes a processor 602 (one or more) and four exemplary memory devices: a RAM 604, a boot ROM 606, a mass storage device (hard disk) 608, and a flash memory 610, all communicating via a common bus 612. As is known in the art, processing and memory can include any computer readable medium storing software and/or firmware and/or any hardware element(s) including but not limited to field programmable logic array (FPLA) element(s), hard-wired logic element(s), field programmable gate array (FPGA) element(s), and application-specific integrated circuit (ASIC) element(s). Any instruction set architecture may be used in processor 602 including but not limited to reduced instruction set computer (RISC) architecture and/or complex instruction set computer (CISC) architecture. A module (processing module) 614 is shown on mass storage 608, but as will be obvious to one skilled in the art, could be located on any of the memory devices.

Mass storage device 608 is a non-limiting example of a computer-readable storage medium bearing computer-readable code for implementing the data storage and retrieval (descriptor execution, LOAD and STORE) methodology described herein. Other examples of such computer-readable storage media include read-only memories such as CDs bearing such code.

System 600 may have an operating system stored on the memory devices, the ROM may include boot code for the system, and the processor may be configured for executing the boot code to load the operating system to RAM 604, executing the operating system to copy computer-readable code to RAM 604 and execute the code.

Network connection 620 provides communications to and from system 600. Typically, a single network connection provides one or more links, including virtual connections, to other devices on local and/or remote networks. Alternatively, system 600 can include more than one network connection (not shown), each network connection providing one or more links to other devices and/or networks.

System 600 can be implemented as a server or client respectively connected through a network to a client or server.

Referring again to FIG. 1, system 600 can implement a computer such as local computer 100, processor 602 can implement a CPU such as local CPU 102, RAM 604 can implement DDR such as local DDR 104, and network connection 620 can implement NICs such as local NIC 106.

Note that a variety of implementations for modules and processing are possible, depending on the application. Modules are preferably implemented in software, but can also be implemented in hardware and firmware, on a single processor or distributed processors, at one or more locations. The above-described module functions can be combined and implemented as fewer modules or separated into sub-functions and implemented as a larger number of modules. Based on the above description, one skilled in the art will be able to design an implementation for a specific application.

Note that the above-described examples, numbers used, and exemplary calculations are to assist in the description of this embodiment. Inadvertent typographical errors, mathematical errors, and/or the use of simplified calculations do not detract from the utility and basic advantages of the invention.

To the extent that the appended claims have been drafted without multiple dependencies, this has been done only to accommodate formal requirements in jurisdictions that do not allow such multiple dependencies. Note that all possible combinations of features that would be implied by rendering the claims multiply dependent are explicitly envisaged and should be considered part of the invention.

It will be appreciated that the above descriptions are intended only to serve as examples, and that many other embodiments are possible within the scope of the present invention as defined in the appended claims.

What is claimed is:

1. A method for accessing data comprising the steps of:
    (a) issuing, by a CPU, a LOAD command including a virtual address;
    (b) deriving network access information based on said virtual address, said network access information including one or more references to a remote memory;
    (c) checking, using said one or more references to said remote memory, if access is allowed to said remote memory;
    (d) if access is denied to said remote memory:
        (i) then
            (A) notifying the CPU said LOAD command failed; and
            (B) invoking management software to handle said failure of said LOAD command,
        (ii) else attempt to load data from said remote memory;
    (e) if said attempt is successful:
        (i) then returning said data to the CPU;
        (ii) else
            (A) notifying the CPU said LOAD command failed; and
            (B) invoking management software to handle said failure of said LOAD command.

2. The method of claim 1 further including after said step of issuing:
    setting a load timer; and if said load timer expires before said data is returned to the CPU then continuing with step 1(e)(ii).

3. The method of claim 1 wherein said step of deriving network access information includes:
    (a) translating said virtual address to a physical address;
    (b) parsing said physical address for a network address index; and
    (c) retrieving at least a portion of said network access information based on said network address index.

4. The method of claim 3 wherein said step of retrieving is from a network connection table.

5. The method of claim 3 further including: parsing said physical address for a remote virtual address portion of said network access information.

6. The method of claim 1 wherein said step of deriving network access information includes:
    (a) translating said virtual address to a physical address;
    (b) parsing said physical address for at least a portion of said network access information.

7. The method of claim 1 further including after said step of deriving network access information: waiting for any previously issued STORE commands to said remote memory to be completed prior to continuing with said step of checking.

8. The method of claim 1 wherein after said attempt fails further including prior to said step of notifying the CPU: repeating attempt to load data from said remote memory.

9. A method for accessing data comprising the steps of:
    (a) issuing, by a CPU, a STORE command including a virtual address;
    (b) deriving network access information based on said virtual address, said network access information including one or more references to a remote memory;
    (c) checking, using said one or more references to said remote memory, if access is allowed to said remote memory;
    (d) if access is denied to said remote memory:
        (i) then
            (A) notifying the CPU said STORE command failed; and
            (B) invoking management software to handle said failure of said STORE command,
        (ii) else attempt to store data to said remote memory;
    (e) if said attempt is successful:
        (i) then continue with normal operation of the CPU;
        (ii) else
            (A) notifying the CPU said STORE command failed; and
            (B) invoking management software to handle said failure of said STORE command.

10. The method of claim 9 wherein said step of deriving network access information includes:
    (a) translating said virtual address to a physical address;
    (b) parsing said physical address for a network address index; and
    (c) retrieving at least a portion of said network access information based on said network address index.

11. The method of claim 10 wherein said step of retrieving is from a network connection table.

12. The method of claim 10 further including: parsing said physical address for a remote virtual address portion of said network access information.

13. The method of claim 9 wherein said step of deriving network access information includes:
    (a) translating said virtual address to a physical address;
    (b) parsing said physical address for at least a portion of said network access information.

14. The method of claim 9 further including after said step of deriving network access information: if said remote memory is strongly ordered then waiting for any previously issued STORE commands to said remote memory to be completed prior to continuing with said step of checking.

15. The method of claim 9 wherein after said attempt fails further including prior to said step of notifying the CPU: repeating attempt to store data to said remote memory.

16. A system for accessing data comprising:
    (a) a processing system containing one or more processors, said processing system being configured to:
        (i) issue a LOAD command including a virtual address;
        (ii) derive network access information based on said virtual address, said network access information including one or more references to a remote memory;

(iii) check, using said one or more references to said remote memory, if access is allowed to said remote memory;
(iv) if access is denied to said remote memory:
  (A) then
    (I) send a notification that said LOAD command failed; and
    (II) invoke management software to handle said failure of said LOAD command,
  (B) else attempt to load data from said remote memory;
(v) if said attempt is successful:
  (A) then return said data;
  (B) else
    (I) send a notification that said LOAD command failed; and
    (II) invoke management software to handle said failure of said LOAD command.

17. A system for accessing data comprising:
(a) a processing system containing one or more processors, said processing system being configured to:
  (i) issue a STORE command including a virtual address;
  (ii) derive network access information based on said virtual address, said network access information including one or more references to a remote memory;
  (iii) check, using said one or more references to said remote memory, if access is allowed to said remote memory;
  (iv) if access is denied to said remote memory:
    (A) then
      (I) send a notification that said STORE command failed; and
      (II) invoke management software to handle said failure of said STORE command,
    (B) else attempt to store data to said remote memory;
  (v) if said attempt is successful:
    (A) then continue with normal operation of the system;
    (B) else
      (I) send a notification that said STORE command failed; and
      (II) invoke management software to handle failure of said attempt.

18. A non-transitory computer-readable storage medium having embedded thereon computer-readable code for accessing data, the computer-readable code comprising program code for:
(a) issuing, by a CPU, a LOAD command including a virtual address;
(b) deriving network access information based on said virtual address, said network access information including one or more references to a remote memory;
(c) checking, using said one or more references to said remote memory, if access is allowed to said remote memory;
(d) if access is denied to said remote memory:
  (i) then
    (A) notifying the CPU said LOAD command failed; and
    (B) invoking management software to handle said failure of said LOAD command,
  (ii) else attempt to load data from said remote memory;
(e) if said attempt is successful:
  (i) then returning said data to the CPU;
  (ii) else
    (A) notifying the CPU said LOAD command failed; and
    (B) invoking management software to handle said failure of said LOAD command.

19. A non-transitory computer-readable storage medium having embedded thereon computer-readable code for accessing data, the computer-readable code comprising program code for:
(a) issuing, by a CPU, a STORE command including a virtual address;
(b) deriving network access information based on said virtual address, said network access information including one or more references to a remote memory;
(c) checking, using said one or more references to said remote memory, if access is allowed to said remote memory;
(d) if access is denied to said remote memory:
  (i) then
    (A) notifying the CPU said STORE command failed; and
    (B) invoking management software to handle said failure of said STORE command,
  (ii) else attempt to store data to said remote memory;
(e) if said attempt is successful:
  (i) then continue with normal operation of the CPU;
  (ii) else
    (A) notifying the CPU said STORE command failed; and
    (B) invoking management software to handle said failure of said STORE command.

* * * * *